(12) United States Patent
Bennett et al.

(10) Patent No.: US 8,973,064 B2
(45) Date of Patent: Mar. 3, 2015

(54) PARALLEL TELEVISION BASED MEDIA RECORDING

(75) Inventors: James D. Bennett, Prague (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1493 days.

(21) Appl. No.: 11/419,140

(22) Filed: May 18, 2006

(65) Prior Publication Data

US 2007/0162941 A1    Jul. 12, 2007

Related U.S. Application Data

(60) Provisional application No. 60/758,488, filed on Jan. 12, 2006.

(51) Int. Cl.

| H04N 7/18 | (2006.01) |
| H04N 7/173 | (2011.01) |
| H04N 5/44 | (2011.01) |
| H04N 21/2543 | (2011.01) |
| H04N 21/41 | (2011.01) |
| H04N 21/4147 | (2011.01) |

(Continued)

(52) U.S. Cl.
CPC ......... *H04N 5/4403* (2013.01); *H04N 7/17318* (2013.01); *H04N 21/2543* (2013.01); *H04N 21/4126* (2013.01); *H04N 21/4147* (2013.01); *H04N 21/4227* (2013.01); *H04N 21/42669* (2013.01); *H04N 21/440263* (2013.01); *H04N 21/6125* (2013.01); *H04N 21/6175* (2013.01)
USPC .................. 725/80; 725/74; 725/78; 725/82; 725/133

(58) Field of Classification Search
USPC ........ 725/48, 59, 109, 133, 141, 80; 348/734; 248/734
See application file for complete search history.

(56) References Cited

U.S. PATENT DOCUMENTS

| 6,263,503 B1 * | 7/2001 | Margulis ........................ 725/81 |
| 6,957,396 B2 * | 10/2005 | Iwamura ....................... 715/771 |

(Continued)

FOREIGN PATENT DOCUMENTS

| CN | 1237308 A | 12/1999 |
| CN | 1499884 | 5/2004 |
| CN | 1525728 | 9/2004 |

OTHER PUBLICATIONS

European Search Report, Application No. 06018806.7-1907, Dated Jun. 10, 2013.

*Primary Examiner* — Nasser Goodarzi
*Assistant Examiner* — Fred Peng
(74) *Attorney, Agent, or Firm* — Brinks Gilson & Lione

(57) ABSTRACT

A control device that interacts with a television system. The control device may receive a user input identifying a video selection. At least one module of the control device may display video information corresponding to the video selection. The control device may alternately, or in addition, cause display of the video information on a television system. The control device may respond to a second user input identifying a storage selection by triggering storage of the video information in a storage unit corresponding to the storage selection. The control device may also receive a third user input identifying a replay request for other video information that may be selected from a plurality of stored videos. The control device may direct display of the other video information on the television system and/or on a display of the control device.

24 Claims, 9 Drawing Sheets

(51) Int. Cl.
*H04N 21/4227* (2011.01)
*H04N 21/426* (2011.01)
*H04N 21/4402* (2011.01)
*H04N 21/61* (2011.01)

(56) References Cited

U.S. PATENT DOCUMENTS

| | | | |
|---|---|---|---|
| 6,970,127 B2 * | 11/2005 | Rakib | 341/173 |
| 7,028,329 B1 * | 4/2006 | Mizutani | 725/109 |
| 7,344,084 B2 | 3/2008 | Da Costa | |
| 7,518,503 B2 * | 4/2009 | Peele | 340/539.11 |
| 7,535,718 B2 * | 5/2009 | Le | 361/737 |
| 7,548,736 B2 * | 6/2009 | Sakai et al. | 455/151.2 |
| 7,634,795 B2 * | 12/2009 | Dureau | 725/80 |
| 2002/0019984 A1 | 2/2002 | Rakib | |
| 2002/0023266 A1 * | 2/2002 | Kawana et al. | 725/81 |
| 2002/0059596 A1 * | 5/2002 | Sano et al. | 725/39 |
| 2003/0106071 A1 * | 6/2003 | Akamatsu et al. | 725/139 |
| 2003/0172380 A1 * | 9/2003 | Kikinis | 725/39 |
| 2005/0054337 A1 | 3/2005 | Nobusawa et al. | |
| 2005/0055716 A1 | 3/2005 | Louie et al. | |
| 2005/0102698 A1 * | 5/2005 | Bumgardner et al. | 725/80 |
| 2006/0095800 A1 * | 5/2006 | Iwamoto | 713/300 |
| 2007/0076876 A1 * | 4/2007 | Kaplan | 380/255 |
| 2011/0185392 A1 * | 7/2011 | Walker | 725/82 |
| 2012/0079525 A1 * | 3/2012 | Ellis et al. | 725/28 |

* cited by examiner

PARALLEL TELEVISION BASED MEDIA RECORDING

CROSS-REFERENCE TO RELATED APPLICATIONS/INCORPORATION BY REFERENCE

This patent application is related to and claims priority from U.S. Provisional Patent Application Ser. No. 60/758,488, filed Jan. 12, 2006, and titled "PARALLEL TELEVISION BASED MEDIA RECORDING," the contents of which are hereby incorporated herein by reference in their entirety.

The present application is related to U.S. patent application Ser. No. 11/290,974, filed Nov. 30, 2005, titled "PARALLEL TELEVISION REMOTE CONTROL," U.S. patent application Ser. No. 11/290,297, filed Nov. 30, 2005, titled "CONTROL DEVICE WITH LANGUAGE SELECTIVITY," U.S. patent application Ser. No. 11/289,971, filed Nov. 30, 2005, titled "PHONE BASED TELEVISION REMOTE CONTROL," U.S. patent application Ser. No. 11/289,848, filed Nov. 30, 2005, titled "PARALLEL TELEVISION DOCKING ADAPTER, U.S. patent application Ser. No. 11/290,079, filed Nov. 30, 2005, titled "UNIVERSAL PARALLEL TELEVISION REMOTE CONTROL," U.S. patent application Ser. No. 12/718,256, filed Mar. 5, 2010, titled "LAPTOP BASED TELEVISION REMOTE CONTROL," U.S. patent application Ser. No. 11/419,152, filed May 18, 2006, titled "PARALLEL TELEVISION BASED VIDEO SEARCHING," and U.S. patent application Ser. No. 11/419,146, filed May 18, 2006, titled "PARALLEL TELEVISION BASED MEDIA INTERACTION," each of which are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

1. Field of the Invention

Various aspects of the present invention relate to controlling recording and replay of multimedia information through interaction with a storage system.

2. Description of the Related Art

Television channel broadcasters or television channel service providers provide hundreds of television channels to viewers. Of the hundreds, a viewer may subscribe to all or select a few of the channels. Often, the viewer desires to watch a television show after it has been telecast because the viewer might have missed the show or might want to watch the show again. Personal Video Recording (PVR) systems are available in market that allow the viewer to record television shows or programs so that the viewer can play back recorded shows at a later time. In most PVR systems, the viewer must know at what time a particular television show will be telecast and accordingly the viewer has to set the start and stop timers of the PVR system. It is not possible for the viewer to record a show whose telecast timing the viewer is not aware of. Again, if there is a change in telecast timing, the viewer may end up recording a show the viewer didn't desire to record.

A PVR system is typically attached to a television or a set top box supplied by a television channel service provider. The set top box is typically a cable set top box or a satellite set top box. The PVR system records the television show in a storage medium, which is typically a compact disc, hard drive or tape. The viewer typically keeps the PVR system at home, and if the viewer wants to watch the recorded show when the viewer is away from home, then the viewer may have to physically carry the PVR system and the storage medium with him. Carrying the PVR system is generally difficult, if not impossible.

Further limitations and disadvantages of conventional and traditional approaches will become apparent to one of ordinary skill in the art through comparison of such systems with various aspects of the present invention.

BRIEF SUMMARY OF THE INVENTION

A remote control device that interacts with a television, a media storage system and/or a media source, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
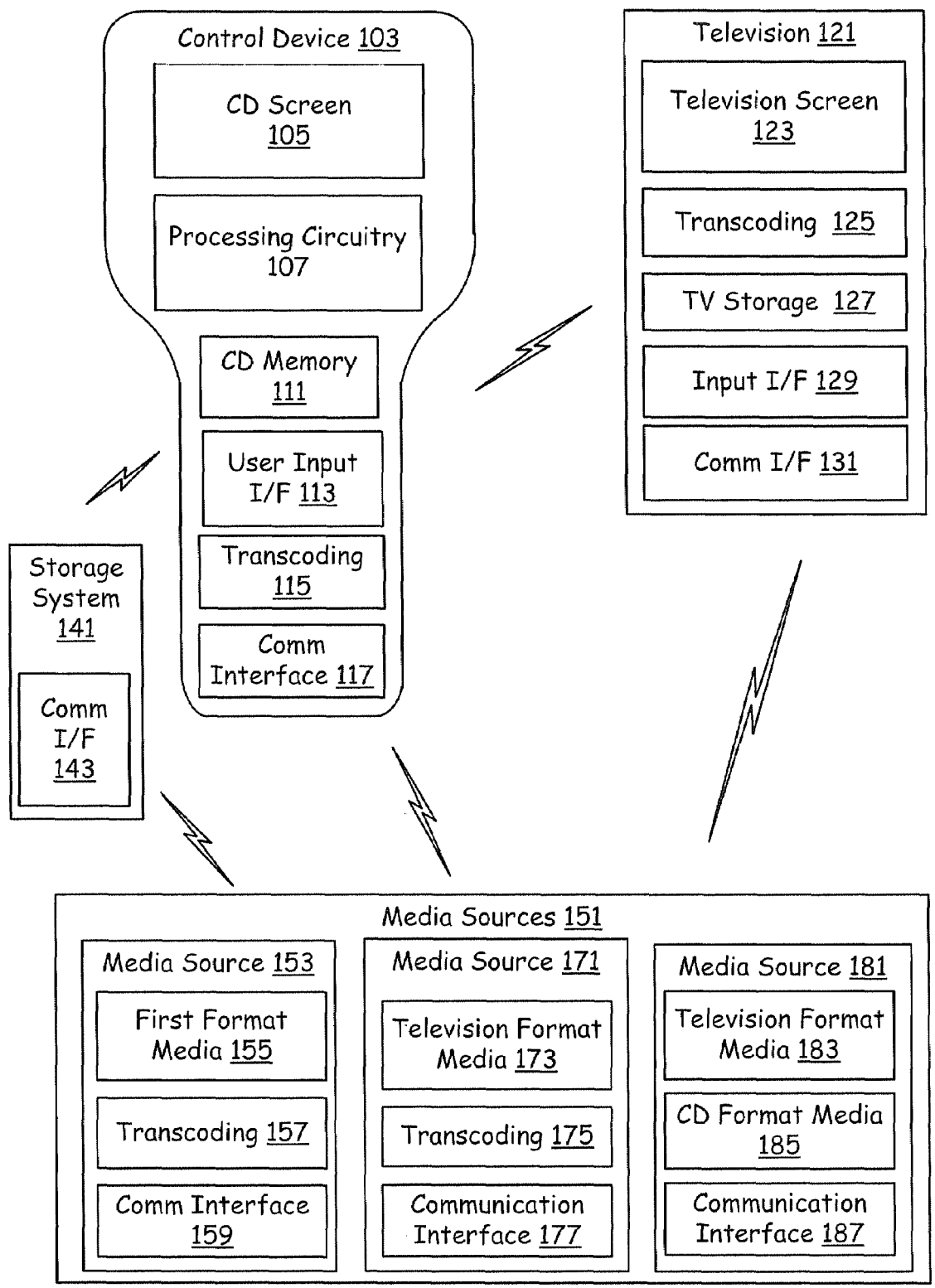
FIG. 1 is a schematic block diagram illustrating interaction between a control device that remotely controls storing of a media element in a storage system and replay of the stored media element, the storage system, media sources and a television in accordance with various aspects of the present invention.

FIG. 1 is a schematic block diagram illustrating interaction between a control device 103 that remotely controls storing of a media element (e.g., video information) in a storage system 141 and replay of the stored media element, the storage system 141, media sources 151 and a television 121 in accordance with various aspects of the present invention. The control device 103 comprises a control device screen 105 (e.g., a video display), processing circuitry 107, (e.g., which may comprise various hardware and/or software modules), a memory 111, a user input interface 113, a transcoding unit 115 and a communication interface 117. The control device 103 communicates with the television 121, the storage system 141 and the media sources 151 via the communication interface 117. The communication interface 117 may, for example, comprise a wireless interface and a wired interface so that the control device 103 may communicate with the television 121, the storage system 141 and the media sources 151 via any one or both of a wireless link and a wired link. For example and without limitation, the wireless link may comprise characteristics of an infrared link, a Bluetooth link, an IEEE 802.11 link, an IEEE 802.15 link, a GSM link, a GPRS link, a CDMA link, a microwave link, an Ethernet link and the wired link may comprise characteristics of a fiber optic link, a copper link or any other standard or proprietary link.

The television 121 comprises a television screen 123, a transcoding unit 125, a storage unit 127, an input interface 129 and a communication interface 131. The television 121 is communicatively coupled to the control device 103 and media sources 151 via the communication interface 131. The television 121 interacts with the media sources 151 over one or more of a wired link and a wireless link. The storage system 141 comprises a communication interface 143 via which the storage system 141 interacts with the control device 103 and the media sources 151. The storage system 141 may, for example, comprise characteristics of an optical storage device or a magnetic storage device. The storage system 141 may be, for example and without limitation, a portable storage device. The media sources 151 comprise a first media source 153, a second media source 171 and a third media source 181. The media sources 151 comprise a plurality of media elements. A media element may generally comprise characteristics of any of a variety of selectable units of media information (e.g., multimedia information). For example and without limitation, each of the plurality of media elements may generally comprise characteristics of a movie, a music video, a television program, a television channel, a sporting or other entertainment event, a news report, a computer game or any of a variety of units of recorded or live multimedia information.

The user input interface 113 of the control device 103 receives a selection from a user (e.g., a user input identifying a video selection), the processing circuitry 107 retrieves via the communication interface 117 a first video stream (or, for example, any of a variety of types of video information) from the media sources 151, and the control device screen 105 displays the first video stream. The processing circuitry 107 of the control device 103 also delivers (e.g., transmits) a control signal via the communication interface 117 to the television 121, where the control signal is adapted to direct display of a second video stream on the television screen 123. The first video stream is identified for the control device screen 105 and the second video stream is identified for the television screen 123 by the selection from the user. The second video stream is delivered to the television 121 from the media sources 151.

The selection by the user may, for example, identify two (or any number of) media elements where each media element has an audio portion and a video portion. The selection may be performed using a media guide. A media guide may, for example, comprise a list that identifies a plurality of media elements available with the media sources 151. The communication interface 117 receives the media guide (e.g., any of a variety of types of media guide information) from the media sources 151 (or any of a variety of sources), the control device memory 111 stores the media guide, and the control device screen 105 displays the media guide. The user may, for example, select two media elements, one media element for the television 121 and another media element for the control device 103 using the media guide. The selection is entered through the user input interface 113. Subsequently, the processing circuitry 107 of the control device 103 triggers delivery of a first of the two selected media elements from the media sources 151 to the television 121 for display on the television screen 123. The processing circuitry 107 also delivers a video portion of a second of the two selected media elements to the control device screen 105 for display.

The user input interface 113 may also, for example, receive a storage selection from the user. The storage selection may identify a third media element. The user may input the storage selection using the media guide. The processing circuitry 107 sends a second control signal that directs delivery of the third media element from the media sources 151 to the storage system 141. The storage selection may alternately identify the first of the two selected media elements or the second of the two selected media elements.

The user input interface 113 may additionally, for example, receive a replay request from the user. The replay request may identify a fourth media element that is stored in the storage system 141. The processing circuitry 107 of the control device 103 transmits a third control signal that directs delivery of the fourth media element from the storage system 141 to the control device 103. The communication interface 117 of the control device 103 receives the fourth media element from the storage system 141 and the control device screen 105 displays a video portion of the fourth media element. The replay request from the user may be preceded by the storage selection from the user. The fourth media element selected by the replay request in such a case may be the third media element selected by the storage selection.

The replay request from the user may be based on a second media guide. The second media guide may, for example, identify a second plurality of media elements stored in the storage system 141. The fourth media element may be selected from the second plurality of media elements using the second media guide.

The first media element may be processed for (e.g., specifically adapted for) the television screen 123, and the second media element may be processed for (e.g., specifically adapted for) the control device screen 105. Such processing may, for example and without limitation, comprise transcoding, encoding and decoding, and/or various fitting functionalities. Any or all of such functionalities can be employed or disabled in the control device 103, in the television 121, in the media sources 151 or in the storage system 141. For example, the control device 103 may employ transcoding in block 115, the television 121 may employ transcoding in block 125, and the media source 153 may employ transcoding in block 157.

The third media element may be processed for the control device screen 105 prior to storage in the storage system 141. The processing may be performed by one of the media sources 151 (the first media source 153, the second media source 171 or the third media source 181) that supplies the third media element. Alternately, the control device 103 may perform the processing functionality. In the alternative case, the control device 103 may direct delivery of the third media element from the media source to the storage system 141 via the control device 103. If the media source does not employ the processing functionality then the control device 103 may perform the processing functionality on the third media element.

The first media source 153 of the media sources 151 supports media in a first format 155. The first media source 153 employs transcoding in block 157. Transcoding may, for example, be performed on the media in the first format to save bandwidth. The second media source 171 of the media sources 151 supports media in television format 173 (i.e., a format that is prescribed for the television screen 123, for example, HDTV (High Definition Television) format). The third media source 181 of the media sources 151 supports media in television format 183 and media in control device format 185 (e.g., QVGA (Quarter Video Graphics Array) format). The encoding/decoding functionality may, for example, be advantageous, when the media source handles differently encoded media.

Figure 2:
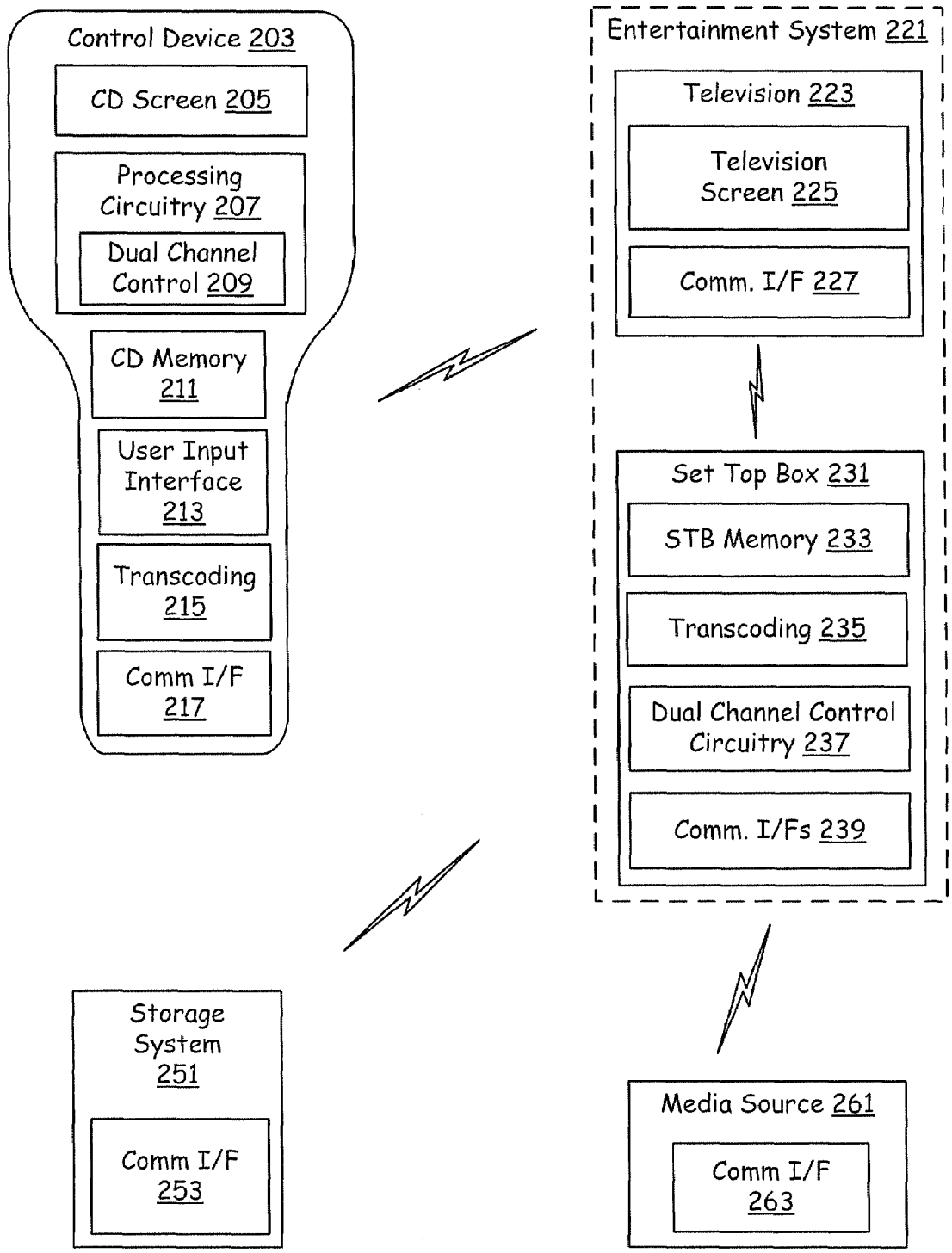
FIG. 2 is a schematic block diagram illustrating an embodiment of the control device of FIG. 1 where the control device interacts with the television via a set top box that is housed with the television in an entertainment system.

FIG. 2 is a schematic block diagram illustrating an embodiment of the control device 103 of FIG. 1 where the control device 203 interacts with the television 223 via a set top box 231 that is housed with the television 223 in an entertainment system 221 (or, e.g., any of a variety of television system configurations). The user input interface 213 of the control device 203 receives a selection from the user. The selection may, for example, identify (e.g., directly or indirectly) a storage request for a video stream (or, e.g., any of a variety of types of video information) in the storage system 251. The processing circuitry 207 of the control device 203 sends a control signal via the communication interface 217 to the set top box 231 directing the set top box 231 to retrieve the video stream and store the video stream in the storage system 251. The set top box 231 retrieves the video stream from the media source 261 using the set top box communication interface 239 and sends the retrieved video stream to the storage system 251 using set top box communication interface 239. The set top box communication interface 239 may comprise one or more interfaces to communicate with the media source 261, the control device 203, the television 223 and the storage system 251. The storage system 251 may be, for example, a powered device or may be powered by the set top box 231.

The selection may, for example, identify (e.g., directly or indirectly) a storage request for the video stream in the set top box memory 233. The set top box 231 stores the retrieved video stream in the set top box memory 233.

The selection may, for example, identify a stored video perusal request. The processing circuitry 207 of the control device 203 sends a second control signal via the communication interface 217 to the set top box 231 triggering the set top box 231 to retrieve video guide information. The video guide information identifies a plurality of video streams (e.g., variety of types of video information) stored in the storage system 251. The video guide information, for example and without limitation, may be stored in the storage system 251. In one embodiment, the video guide information may be stored in the set top box memory 233. The set top box 231 retrieves the video guide information and forwards the video guide information to the control device 203 using the set top box communication interface 239. The communication interface 217 of the control device 203 receives the video guide information and forwards the video guide information to the control device screen 205 for display. In a second embodiment, the control device 203 may store the video guide information in the control device memory 211 in addition to displaying the video guide information on the control device screen 205.

The selection may, for example, identify a replay request and a second video stream stored in the storage system 251. The control device 203 transmits a third control signal to the set top box 231 triggering the set top box 231 to retrieve the second video stream from the storage system 251 and to forward the retrieved second video stream to the control device 203. The control device 203 displays the second video stream on the control device screen 205 after receiving the second video stream from the set top box 231. Selection of the second video stream stored in the storage system 251 may be based on the video guide information.

In an embodiment, the control device 203 is adapted to control replay of the second video stream on the control device screen 205. In the embodiment the second video stream may be processed for the control device screen 205. For example and without limitation, the control device screen 205 supports QVGA (Quarter Video Graphics Array) format, while the second video stream may be in HDTV (High Definition Television) format. The set top box 231, upon being triggered by the control device 203, retrieves the second video stream from the storage system 251. Transcoding unit 235 of the set top box 231 performs transcoding functionality on the second video stream and converts the second video stream into QVGA format. The set top box 231 sends the second video stream in the QVGA format to the control device 203. The control device 203 displays the second video steam in the QVGA format on the control device screen 205.

In the embodiment, the control device 203 may, for example and without limitation, process a video stream selected for storage in the storage system 251. Processing may be necessary to adapt the selected video stream for the control device screen 205. Processing may, for example, include one or more of a formatting functionality, transcoding functionality and encoding/decoding functionality. The control device 203 directs the set top box 231 to retrieve the video stream selected for storage from the media source 261. The set top box 231 retrieves the video stream and forwards the video stream to the control device 203. The control device 203 processes the video stream and forwards the processed video stream to the set top box 231. The set top box 231 sends the processed video stream to the storage system 251 for storing. A subsequent replay request for the video stream received by the control device 203 might not need processing of the already processed video stream.

In another embodiment, the set top box 231 sends the second video stream to the control device 203 in the HDTV format. The transcoding unit 235 of the set top box 231 performs transcoding functionality on the second video stream and converts the second video stream into QVGA format. The second video stream is then available in a format supported by the control device screen 205.

In yet another embodiment, the control device 203 is adapted to control replay of the second video stream on the control device screen 205 and on the television screen 225. In the yet another embodiment, the selection corresponding to the replay request identifies the second video stream and one or more of the control device 203 and the television 223. For example, the selection corresponding to the replay request identifies the television 223. The control device 203 triggers the set top box 231 to receive the second video stream from the storage system 251 and to forward the second video stream to the television 223. The television 223 receives the second video stream from the set top box 231 via communication interface 227 and displays the second video stream on the television screen 225. If the second video stream is not in a format supported by the television screen 225, the transcoding unit 235 of the set top box 231 performs formatting functionality on the second video stream prior to forwarding the second video stream to the television 223.

The communication link between the set top box 231 and the television 223 is shown to be a wireless link. The communication link (e.g., and any communication link discussed herein) may alternatively, for example, comprise characteristics of a wired link, tethered optical link, non-tethered optical link, etc. Communication links between the set top box 231 and the television 223, control device 203, storage system 251 and media source 261 are, in this embodiment, wireless links. Wireless links may comprise characteristics of any of a variety of wireless link types (e.g., Bluetooth, IEEE 802.11, IEEE 802.15, UltraWideBand, any of a variety of cellular link types, any of a variety of infrared or other optical link types, standard or propriety link types, etc.).

Figure 3:
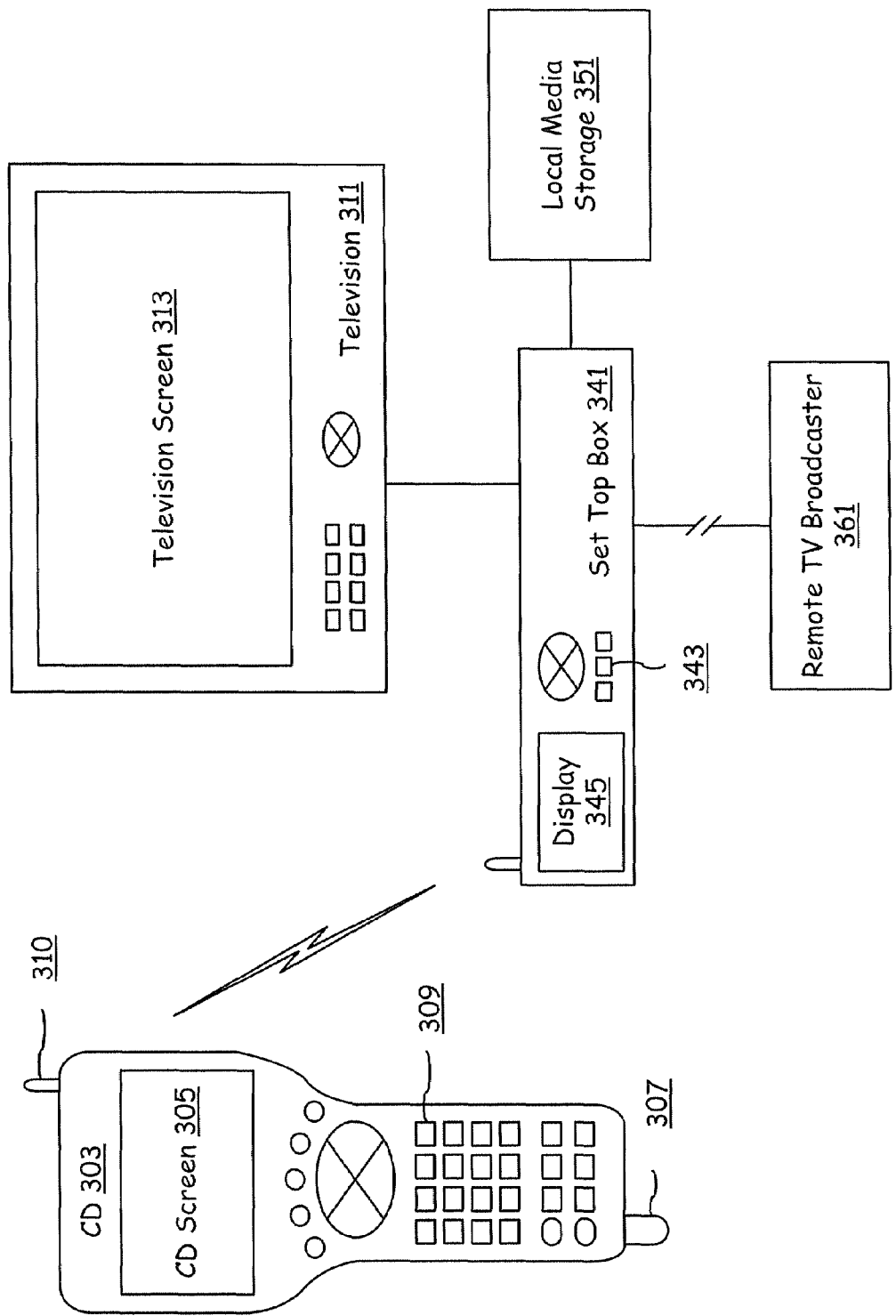
FIG. 3 is a schematic block diagram illustrating an embodiment of the control device of FIG. 2 further providing storage of the media element in a removable storage device.

FIG. 3 is a schematic block diagram illustrating an embodiment of the control device 203 of FIG. 2 further providing storage of the media element in a removable storage device 307. The control device 303 comprises a control device screen 305, a plurality of buttons 309 and a communication interface 310. A user enters a selection using the plurality of buttons 309. The plurality of buttons 309 is a user input interface of the control device 303. The removable storage device 307 may be plugged into the control device 303. The control device 303 communicates over a wireless link with a set top box 341. The set top box 341 is communicatively coupled to a television 311. The television 311 comprises a television screen 313. The set top box 341 comprises a second plurality of buttons 343 and a display 345, one or more of which may be used to control display on the television screen 313 and settings of the television 311. A media storage 351 is communicatively coupled to the set top box 341. The media storage 351 may be any of a variety of types of removable and non-removable storage units in which a plurality of media elements may be stored. The set top box 341 also interacts with a television broadcaster 361. The set top box 341, the media storage 351 and the television 311 are located at a first premises. The television broadcaster 361 is located at a second premises. The control device 303 may alternatively be located at the first premises. The control device 303 may be located at a third premises.

The user enters a storage selection using the plurality of buttons 309. The storage selection identifies a media element and a storage unit. The media element is selected from the plurality of media elements supplied by the television broadcaster 361. The media element comprises characteristics of any of a variety of selectable units of a television channel that may, for example, be a movie, a music video, a television program, a sporting or other entertainment event, a news report, or any of a variety of units of recorded or live multimedia information. The media element may be selected using a television program guide, where the television program guide identifies a plurality of television programs broadcast by the television broadcaster 361 at a given time. The storage unit identified by the storage selection may be one or both of the removable storage device 307 and the media storage 351.

For example and without limitation, the storage selection identifies the removable storage device 307. The control device 303 transmits a control signal to the set top box 341 using the communication interface 310. The control signal triggers the set top box 341 to receive the media element from the television broadcaster 361 and forward the media element to the control device 303. The control device 303 receives the media element via the communication interface 310 and forwards the media element to the removable storage device 307 that is plugged into the control device 303 for storage.

If the storage selection identifies the media storage 351, then the set top box 341 receives the media element from the television broadcaster 361 and forwards the media element to the media storage 351 that is communicatively coupled to the set top box 341 for storage. The control device 303 directs the set top box 341 to perform the above functionalities.

For example, the control device 303 receives a television program guide perusal request via the user input interface 309 (e.g., the plurality of buttons 309). The control device 303 sends a second control signal via the communication interface 310 directing the set top box 341 to retrieve the television program guide. The set top box 341 retrieves the television program guide. In one embodiment, the set top box 341 retrieves the television program guide from the television broadcaster 361. The control device 303 receives the television program guide retrieved by the set top box 341 from the set top box 341 using the communication interface 310. The control device 303 displays the television program guide on the control device screen 305. The control device 303 may subsequently receive a selection of a television program from the plurality of television programs identified by the television program guide. The control device 303 triggers the set top box 341 to receive the selected television program from the television broadcaster 361 and forward the television program to the control device 303. The control device 303, after receiving the selected television program from the television broadcaster 361 via the set top box 341, displays the television program on the control device screen 305. The control device 303 may subsequently receive the storage selection. The control device 303 then directs storage of the television program in the storage unit identified by the storage selection.

For example and without limitation, the control device 303 receives a current television program perusal request via the user input interface 309. The control device 303 sends a third control signal via the communication interface 310 directing the set top box 341 to retrieve the television program currently being displayed on the television screen 313. The television 311 receives any of the plurality of television programs from the television broadcaster 361 via the set top box 341. The set top box 341, in addition to forwarding the current television program to the television 311, forwards the current television program to the control device 303. The control device 303 receives the current television program via the communication interface 310, and the control device screen 305 displays the current television program. The user may select the current television program for storage in media storage 351. Subsequently, the control device 303 directs the set top box 341 to store the current television program in the media storage 351. The current television program may be replayed on the control device screen 305 and/or on the television screen 313 at a later time by retrieving the stored television program from the media storage 351.

Figure 4:
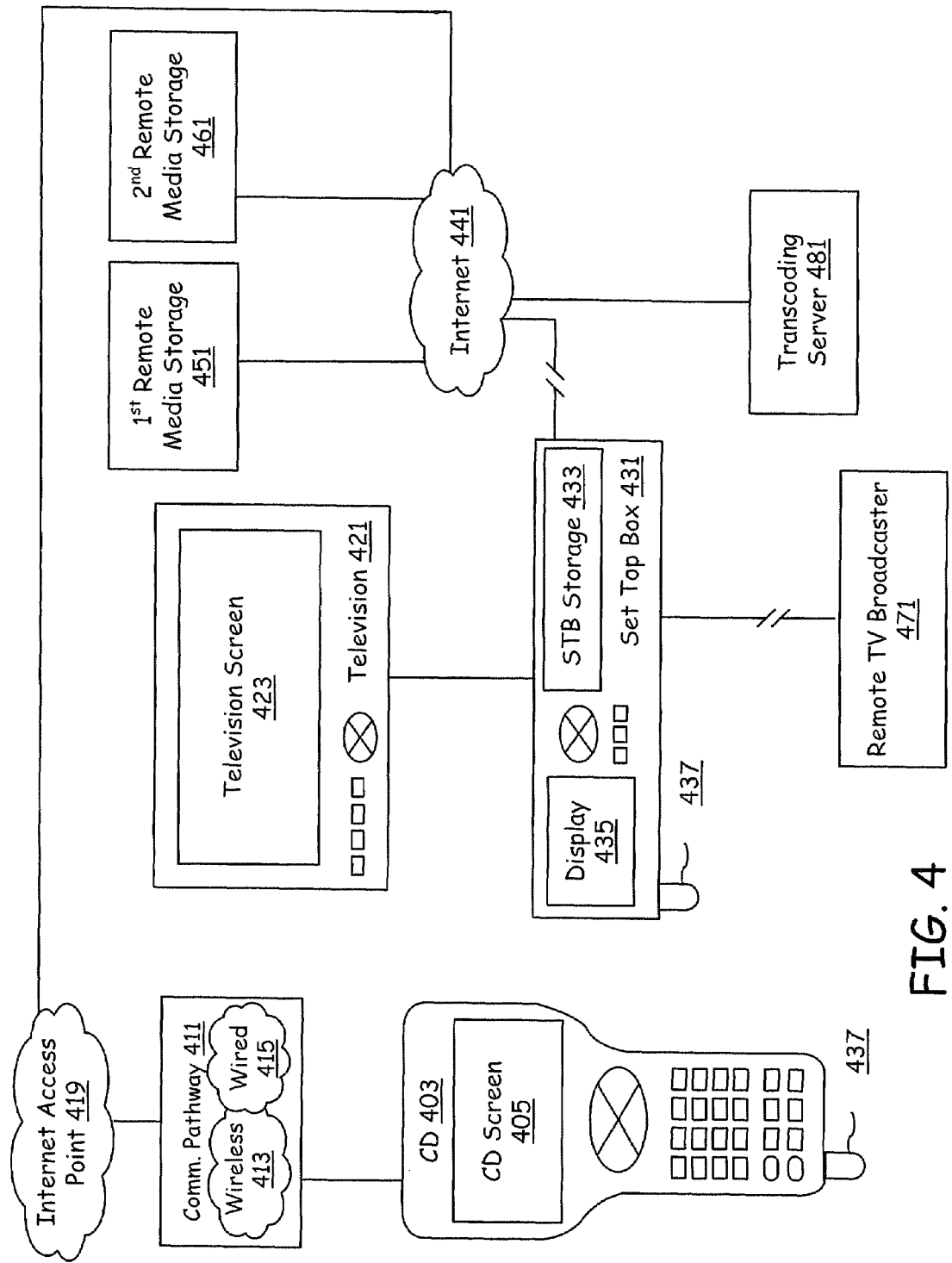
FIG. 4 is a schematic block diagram illustrating an embodiment of the control device of FIG. 2 where the control device interacts with the set top box, the media source and a plurality of storage systems via Internet.

FIG. 4 is a schematic block diagram illustrating an embodiment of the control device 203 of FIG. 2 where the control device 403 interacts with the set top box 431, the media source 471 and a plurality of storage systems, 451 and 461 via the Internet 441. The control device 403 comprises an IP (Internet Protocol) address. The control device 403 is adapted to communicate to any device having another IP address. The control device 403 is communicatively coupled to an Internet access point 419 via any one or combination of a wireless link 413 and a wired link 415. The wireless link 413 may, for example, be one or more of a Bluetooth link, an IEEE 802.11 link, and an IEEE 802.15 link. The wired link 415 may, for example, be one or more of an optical fiber link, a coaxial cable link and an Ethernet link. The control device 403 interacts with the Internet 441 via the Internet access point 419. A first media storage 451, a second media storage 461 and a transcoding server 481 are communicatively coupled to the Internet 441. The control device 403 interacts with the first media storage 451, the second media storage 461 and the transcoding server 481 via the Internet 441 if necessary. The first media storage 451 and the second media storage 461 comprise respectively a first plurality of media elements and a second plurality of media elements. The first plurality of media elements and the second plurality of media elements may be, for example, combinations of stored movies, personal videos, television programs, video portions of television programs and video games. The control device 403 may access the first plurality of media elements and the second plurality of media elements using the Internet 441.

The set top box 431 comprises a set top box storage 433. A removable storage unit 437 is plugged into the set top box 431. The set top box 431 is communicatively coupled to the Internet 441 and communicatively coupled to the first media storage 451, the second media storage 461 and the transcoding server 481 via the Internet 441. The set top box 431 may access the first plurality of media elements and the second plurality of media elements using the Internet 441. The set top box 431 comprises a second IP address. The set top box 431 interacts with a television broadcaster 471. The television broadcaster 471 broadcasts a plurality of television programs. The set top box 431 is communicatively coupled to the television 421 and controls settings and display of the television screen 423. The control device 403 interacts with the set top box 431 via the Internet 441.

The control device 403 comprises a plurality of buttons (or other user interface features) via which a user enters a selection. The control device 403 receives a media selection. The media selection identifies a first media element, the location of the first media element and one or more displays on which the first media element is to be displayed. For example, the first media element is a television program broadcast by the television broadcaster 471 and the location is hence the television broadcaster 471. The media selection identifies the control device screen 405 and the television screen 423 as the displays on which the first media element is to be displayed. The control device 403 instructs the set top box 431 to receive the television program from the television broadcaster 471 and forward the television program to the television 421. The television 421 receives the television program from the set top box 431 and displays the video portion of the television program on the television screen 423. The set top box 431, in addition, sends the television program to the control device 403 via the Internet 441. The control device 403 displays the television program received via the Internet 441 on the control device screen 405.

The control device 403 may subsequently receive a storage selection entered using the plurality of buttons. The storage selection identifies a second media element, a first location where the second media element resides and a second location where the second media element is to be stored. For example and without limitation, the second media element is a movie stored in the first media storage 451, and the second media element is to be stored in the removable storage unit 437. For this example, the first location is the first media storage 451 and the second location is the removable storage unit 437. The control unit 403 sends a control signal to the set top box directing the set top box 431 to receive the movie (the second media element) from the first media storage 451 via the Internet 441 and store the movie in the removable storage unit 437. The control signal reaches the set top box 431 via the Internet access point 419 and the Internet 441.

For example, the removable storage unit 437 may be taken out of the set top box 431 and plugged into the control device 403. The control device 403 may subsequently receive a replay selection. The replay selection identifies a third media element, location where the third media element resides and a display on which the third media element is to be displayed. For example, the replay selection identifies the movie stored in the removable storage unit 437 and the control device screen 405. Thus, the third media element is the movie, and the display on which the third media element is to be displayed is the control device screen 405. The control device 403 directs the movie from the removable storage unit 437 to the control device screen 405 for display.

The control device screen 405 and the television screen 423 may support media in separate formats. When the control device 403 receives a storage selection for the second media element, the control device 403 might not know on which display (the control device screen 405 or the television screen 423) the second media element is to be displayed in the future. In one embodiment, the control unit 403 directs flow of the second media element from the first location (where the second media element resides) to the second location (where the second media element is to be stored) via transcoding server 481. The transcoding server 481 prepares two copies of the second media element (the movie), first copy in the control device screen format and the second copy in the television screen format (formats supported respectively by the control device screen 405 and the television screen 423). The second location (the removable storage unit 437) stores the second media element (the movie) in the control device screen format and in the television screen format.

In another embodiment, the control device 403 allows replay of the third media element on the television screen 423 only. In the embodiment, the control device 403 directs processing (e.g., transcoding) of the second media element (the movie) in the control device screen format only prior to storage in the second location (the removable storage unit 437).

Figure 5:
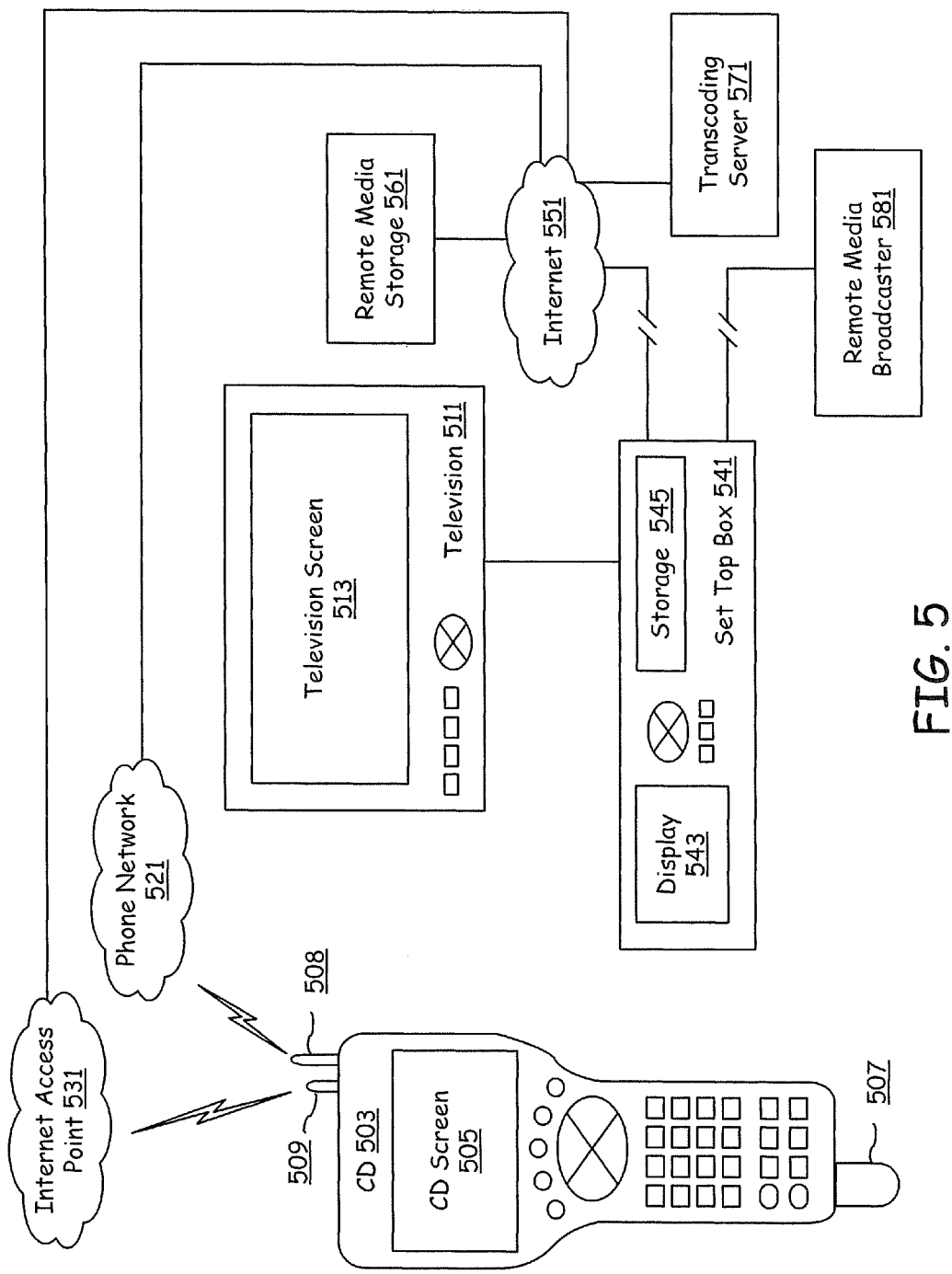
FIG. 5 is a schematic block diagram illustrating an embodiment of the control device of FIG. 4 further providing interaction with the Internet via a phone network.

FIG. 5 is a schematic block diagram illustrating an embodiment of the control device 403 of FIG. 4 further providing interaction with the Internet 551 via a phone network 521. The control device 503 is adapted to interact with the phone network 521 using a first communication interface 508. The control device 503 communicates with the Internet 551 using a second communication interface 509. The control device 503 receives a stored media perusal selection from a user. The user enters the selection using user input interface of the control device 503. The control device 503 retrieves a list identifying a plurality of media elements stored in the media storage 561. The list may reside in the media storage 561. The control device 503 connects to the media storage 561 via the second communication interface 509 and the Internet 551 and retrieves the list. Alternately, the list may reside in the set top box 541. In the alternate case, the control device 503 connects to the set top box 541 via the second communication interface 509 and the Internet 551 and retrieves the list. The control device 503 displays the retrieved list on control device screen 505 for perusal.

The user interacts with the control device 503 visually and may subsequently select a media element from the list for playback. The user enters the selection using the user input interface of the control device 503. The control device 503 communicates with the media storage 561 via the Internet 551 and the second communication interface 509. The control device 503 determines if the media element is in a format that is supported by the control device screen 505. The media element may be, for example, a stored television program, a movie, a personal recorded video or a video game. The control device screen 505, for example and without limitation, may support video in QVGA format. If the video portion of the media element selected for playback is not in the QVGA format, then the control device 503 directs the media element to be communicated to the transcoding server 571 from the media storage 561 via the Internet 551. The control device 503 comprises a first IP (Internet Protocol) address, the media storage 561 comprises a second IP address and the transcoding server 571 comprises a third IP address. The media storage 561 transports the media element selected for playback to the transcoding server 571 using the third IP address. The media storage 561 may be a non-powered unit. For example, the control device 503 and/or the transcoding server 571 may supply power for transportation of the media element from the media storage 561 to the transcoding server 571.

The transcoding server 571 converts the video portion of the media element selected for playback to the QVGA format. The control device 503 receives the media element with the video portion in the QVGA format from the transcoding server 571 via the Internet 551 and the Internet access point 531. The control device 503 interacts with the transcoding server 571 using the first IP address and the third IP address. The control device 503 displays the video portion of the media element (which is in the QVGA format) on the control device screen 505. The media storage 561 is located at a remote premises. The remote media source 561 is, for example, one or more of an Internet server, a personal storage device, an online music store and an Intranet server.

The control device 503 receives a media selection for playback through the user input interface of the control device. The control device 503 is a portable device and may be located at a premises from where the control device 503 is not communicatively coupled to the Internet access point 531. In such a scenario, the control device 503 may initiate communication with the Internet 551 via the phone network 521 and using the first communication interface 508. The control device 503 communicates with the set top box 541, the media storage 561, the transcoding server 571 and communicates indirectly with the television 511 and media broadcaster 581 via the Internet 551 using the phone network 521.

Figure 6:
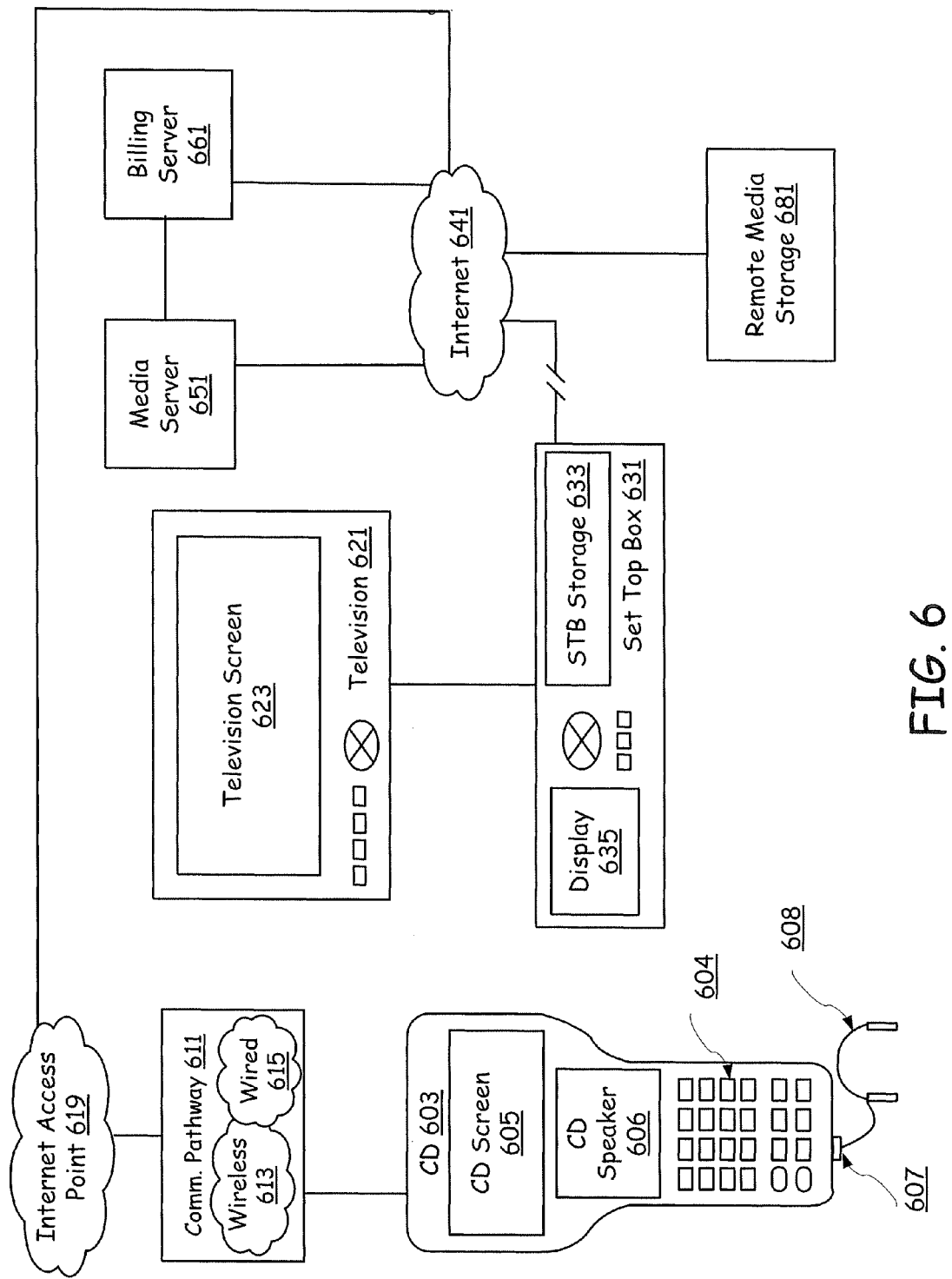
FIG. 6 is a schematic block diagram illustrating an embodiment of the control device of FIG. 4 further supporting media rights purchasing functionality via interaction with a remote billing server.

FIG. 6 is a schematic block diagram illustrating an embodiment of the control device 403 of FIG. 4 further supporting media rights purchasing functionality via interaction with a remote billing server 661. The control device 603 comprises a plurality of buttons 604, a screen 605, a speaker 606 and an audio interface 607. The control device 603 displays a video portion of a multimedia element received by the control device 603 on the screen 605 and plays an audio portion of the multimedia element on the speaker 606. A second speaker 608 (e.g., a headset) picks up the audio portion of the multimedia element if the second speaker 608 is inserted into the audio interface 607 of the control device 603. The control device 603 communicates with the Internet 641 via Internet access point 619 and is hence adapted to interact with any device or system communicatively coupled to the Internet 641. The control device 603 interacts with set top box 631, media server 651, billing server 661 and remote media storage 681 via the Internet 641.

The set top box 631 is communicatively coupled to television 621. The set top box 631 controls settings and display on the television screen 623 of the television 621. The control device 603 accepts a variety of user selections via one or more of the plurality of buttons 604 (or other user interface features). The variety of user selections may identify, for example and without limitation, a change in display setting of the television 621, a change in audio setting of the television 621, a media swap request and a television program perusal request. The control device 603 transmits a variety of control signals in accordance with the variety of user selections to the set top box 631 via the Internet 641, directing the set top box 631 to perform operations according to the variety of user selections. The control device 603 thus indirectly controls settings and display on the television screen 623 of the television 621.

The media server 651 may be, for example, an online music store, a personal media server, a television channel broadcaster, a repository of a plurality of movies, an online video game server, a DVD (Digital Video Disc), a VCD (View Compact Disc) and a cable service provider premises. The media server 651 supplies a plurality of multimedia elements. The plurality of multimedia elements may be one or a combination of selectable units of a movie, a video game, a personal recorded video, a television program and a live or recorded sports or entertainment event. Few or all of the plurality of the multimedia elements available with the media server 651 might not be free to use or free to view. For example, typically, music from an online music store is not free to download using the Internet 641. Also for example, a television channel (e.g., a television program) provided by the cable service provider premises may typically be a pay channel. The media server 651 is communicatively coupled to the billing server 661. The media server 651 interacts with the billing server 661 whenever the media server 651 receives a perusal and/or a download request for a multimedia element that is not free-to-use (e.g., a perusal request for the music from the online music store). In such a case, the media server 651 and the billing server 661 communicate with each other and participate in media rights management processing for the multimedia element that is not free-to-use.

The control device 603 receives a media perusal selection via the plurality of buttons 604. For example and without limitation, the media perusal selection identifies that a television program that is being currently displayed on the television screen 623 is to be displayed on the control device screen 605. The television 621 receives the television program that is being currently displayed on the television screen 623 from the media server 651 via the set top box 631. The media server 651 for this example may be the cable service provider premises. The control device 603 sends a first control signal to the set top box 631 via the Internet 641. The first control signal triggers the set top box 631 to forward the television program to the control device 603 via the Internet 641 in addition to forwarding the television program to the television 621. The control device 603 receives the television program from the set top box 631 and displays the video portion of the television program on the control device screen 605. The control device 603 plays the audio portion of the television program on the control device speaker 606. In one embodiment, the second speaker 608 (e.g., a headset) is inserted into the audio interface 607 of the control device 603. In such an embodiment, the control device 603 does not play the audio portion of the television program on the control device speaker 606. The second speaker 608 picks up the audio portion of the television program. The audio portion of the television program is heard through the second speaker 608. The television program is displayed simultaneously on the television screen 623 and on the control device screen 605.

The user enters a storage selection for the television program using one or more of the plurality of buttons 604. The control device 603 determines that the television program currently being displayed simultaneously on the television screen 623 and on the control device screen 605 is to be stored in the remote media storage 681. The control device 603 sends a second control signal to the set top box 631. The set top box 631, on receiving the second control signal, seeks permission from the media server 651 (e.g., the cable service provider premises) for storing the television program. For example and without limitation, the television program might not be a free-to-store program. Subsequently, the control device 603 interacts with the media server 651 (e.g., the cable service provider premises 651) and the billing server 661 (e.g., via the set top box 631) to perform media rights management processing. The media rights management functionalities may include one or more user interactions. The user enters necessary information via the plurality of buttons 604 during the media rights management processing. The necessary information input by the user is transported to the media server 651 (e.g., the cable service provider premises 651) and the billing server 661 (e.g., via the set top box 631 and the Internet 641) under direction from the control device 603. Once the media rights management processing is over, the set top box 631 receives the television program from the media server 651 (e.g., the cable service provider premises 651) and forwards the television program to the remote media storage 681 via the Internet 641 for storage. The television program, thus stored in the remote media storage 681, may be retrieved in the future by the control device 603 (e.g., directly via the Internet 641 or via the set top box 631) and replayed on one or both of the control device 603 and the television 621.

Figure 7:
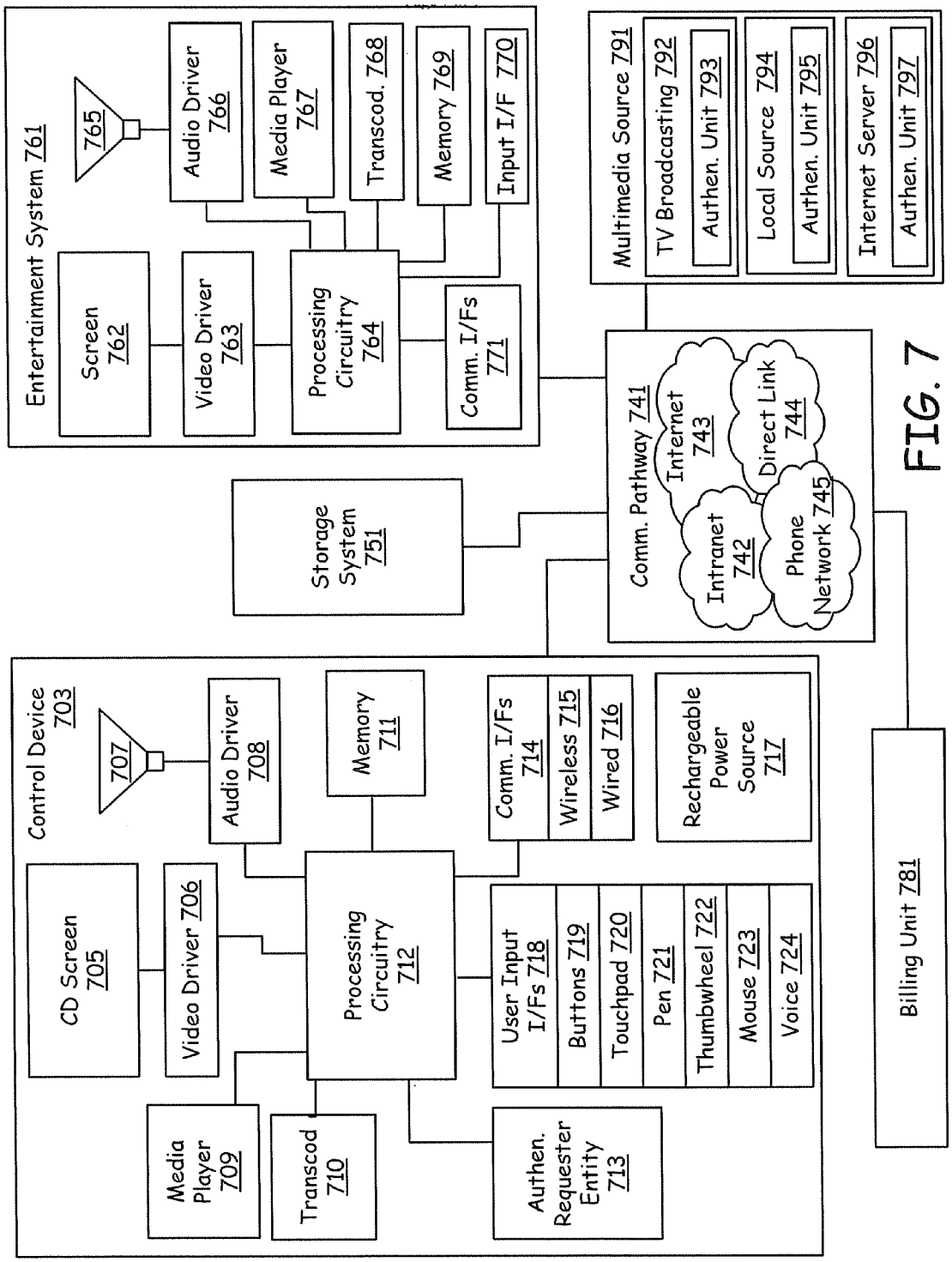
FIG. 7 is a schematic block diagram illustrating interaction between a control device, an entertainment system, a multimedia source, a storage system and a billing unit and communication paths between these elements in accordance with various aspects of the present invention.

FIG. 7 is a schematic block diagram illustrating interaction between a control device 703, an entertainment system 761, a multimedia source 791, a storage system 751 and a billing unit 781 and communication paths 741 between these elements in accordance with various aspects of the present invention. The entertainment system 761 comprises a screen 762, a speaker 765, a user input interface 770, a communication interface 771, a memory 769 and a transcoding unit 768. A user may control video and audio settings of the entertainment system 761 by entering any of a variety of types of selections via the user input interface 770. The user input interface 770 is typically a plurality of buttons. The entertainment system 761 receives a multimedia element from the multimedia source 791 and displays the received multimedia element on the entertainment system screen 762. A plurality of multimedia elements is available with the multimedia source 791. The user may select which of the plurality of multimedia elements to be displayed on the screen 762 by entering a choice via the user input interface 770. A plurality of functionalities, for example and without limitation, swapping of channels, channel scanning and PIP (i.e., picture-in-picture) functionalities may be invoked using the user input interface 770. The entertainment system 761 is typically, for example, a television, a television and a set top box, a home theatre system, a PVR system and a video game box.

The control device 703 comprises a screen 705, a speaker 707, processing circuitry 712, a transcoding unit 710, a memory 711, a user input interface 718, a communication interface 714 and a rechargeable battery 717. The user input interface 718 of the control device 703 may, for example, comprise a plurality of buttons 719, a touchpad 720, a pen-based interface 721, a thumbwheel 722, a mouse 723 and a voice interface 724. The control device 703 is used by the user to control the video and audio settings of the entertainment system 761, to control selection of a second multimedia element for display on the screen 762 and/or on the control device screen 705 and to invoke the plurality of functionalities. The user may enter a variety of selections and/or instructions via the user input interface 718 of the control device 703. The control device 703 generates a variety of control signals in accordance with the variety of selections directing the entertainment system 761 to perform as per the user instructions. The entertainment system 761 may be located at a first premises, and the control device 703 may be located at a second premises. The control device 703 may thus remotely control the entertainment system 761.

The multimedia source 791, for example, may comprise characteristics of a television broadcaster 792, a DVD or a VCD 794 and an Internet server 796. The plurality of multimedia elements available with the multimedia source 791 may be any of a variety of selectable units of media information such as, for example, a movie, a music video, a television program, a television channel, a sporting or other entertainment event, a news report, a computer game or any of a variety of units of recorded or live multimedia information. For example, the multimedia source 791 is a DVD that comprises a movie stored in it. In another example, the multimedia source 791 may be an Internet server, and the plurality of multimedia elements may be a plurality of music videos. In yet another example, the multimedia source 791 may be a television channel broadcaster, and the plurality of multimedia elements may be a plurality of television programs.

The control device 703 controls selection of a second multimedia element from the plurality of multimedia elements and storage of the second multimedia element in any one or more of the storage system 751, the control device memory 711 and the entertainment system memory 769. If necessary, the control device 703 performs media rights management for any of the plurality of multimedia elements via interaction with the billing unit 781. The control device 703 controls replay of a third multimedia stored in any of the storage system 751, the control device memory 711 and the entertainment system memory 769 on the control device 703 and/or on the entertainment system 761.

Figure 8:
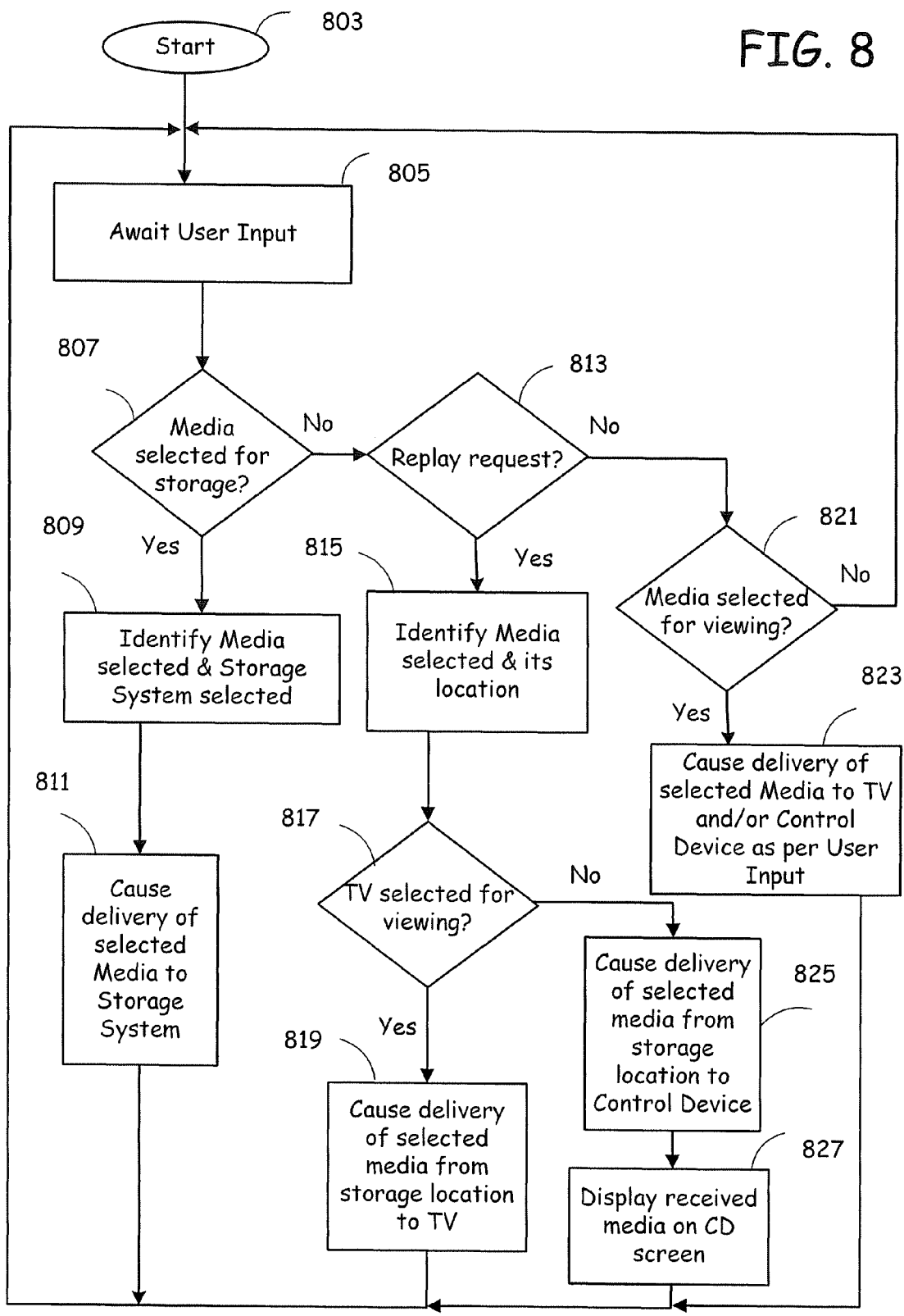
FIG. 8 is a flowchart illustrating a method of responding to user input by a control device by directing storage of a media element, or by directing replay of a stored media element and/or by directing display of the media element on a television and/or on the control device screen, in accordance with various aspects of the present invention.

FIG. 8 is a flowchart illustrating a method of responding to user input by a control device by directing storage of a media element, or by directing replay of a stored media element and/or by directing display of the media element on a television and/or on the control device screen. The method may begin at a start block 803. The control device waits for an input from the user as shown in a next block 805. The user may enter the input through an input interface of the control device. The control device responds to a variety of user inputs. Once the control device receives the user input, the control device interprets the user input. In block 807, the control device determines if the user input corresponds to a media storage request. If so, the control device, at block 809, identifies a first media element that is selected for storage and identifies a storage system selected for storing the first media element (e.g., by analyzing the user input). The storage system may, for example, comprise one of an Internet media server, an Intranet media server and a local media storage such as a hard drive, a DVD, a CD and a tape. The first media element may, for example, comprise a movie, a television channel, an audio-visual game, a photo, a live snippet, a video, a video portion of a television channel or a video game.

The first media element resides in a media source. The media source may, for example, be a television broadcaster, a DVD, a CD, a hard drive, an Internet server, an Intranet server, a photo camera, a video camera or an online music store. The control device generates and sends a first control signal causing delivery of the first media element from the media source to the selected storage system for storage as shown in block 811. Operation of the control device then returns to block 805 where the control device waits for a second input from the user.

Operation of the control device flows to block 813 if the control device determines that the user input does not correspond to the media storage request. At block 803, the control device determines if the user input corresponds to a replay request for stored media information. If so, the control device, at block 815, identifies a second media element that is selected for replay and identifies a location of the second media element where the second media element is stored (e.g., by analyzing the user input or by implementing a search routine). The second media element may again, for example, comprise a movie, a television channel, an audio-visual game, a photo, a live snippet, a video, video portion of a television channel or a video game. At block 817, the control device analyzes the user input to determine if the second media element is chosen to be played on a television. The operation of the control device flows to block 819 if the control device determines that the second media element is selected to be played on a television. In block 819, the control device generates and transmits a second control signal. The second control signal causes delivery of the second media element from the location where the second media element is stored to the television. The television displays the media element (or video portion of the second media element if the second media element comprises a video portion and an audio portion) on a television screen. The operation of the control device then returns to block 805 where the control device waits for a second input from the user.

The operation of the control device flows to a next block 821 if the control device determines that the user input does not correspond to a replay request for stored media information at block 813. The control device determines, at block 821, if the user input corresponds to a media perusal request. If yes, the control device determines, using the user input, a third media element selected for viewing and whether the third media element is selected to be displayed on the television or on the control device or on both. The third media element may again, for example, comprise a movie, a television channel, an audio-visual game, a photo, a live snippet, a video, video portion of a television channel or a video game. In a next block 823, the control device sends one or more control signals directing delivery of the third media element to the television or to the control device or to both, depending on the user input. The television and/or the control device display the third media element (or video portion of the third media element if the third media element comprises a video portion and an audio portion) on respective screens after receiving the third media element. Operation of the control device then returns to block 805 where the control device waits for a second input from the user. If the control device, in block 821, determines that the user input does not correspond to a media perusal request then the operation of the control device returns to block 805.

Figure 9:
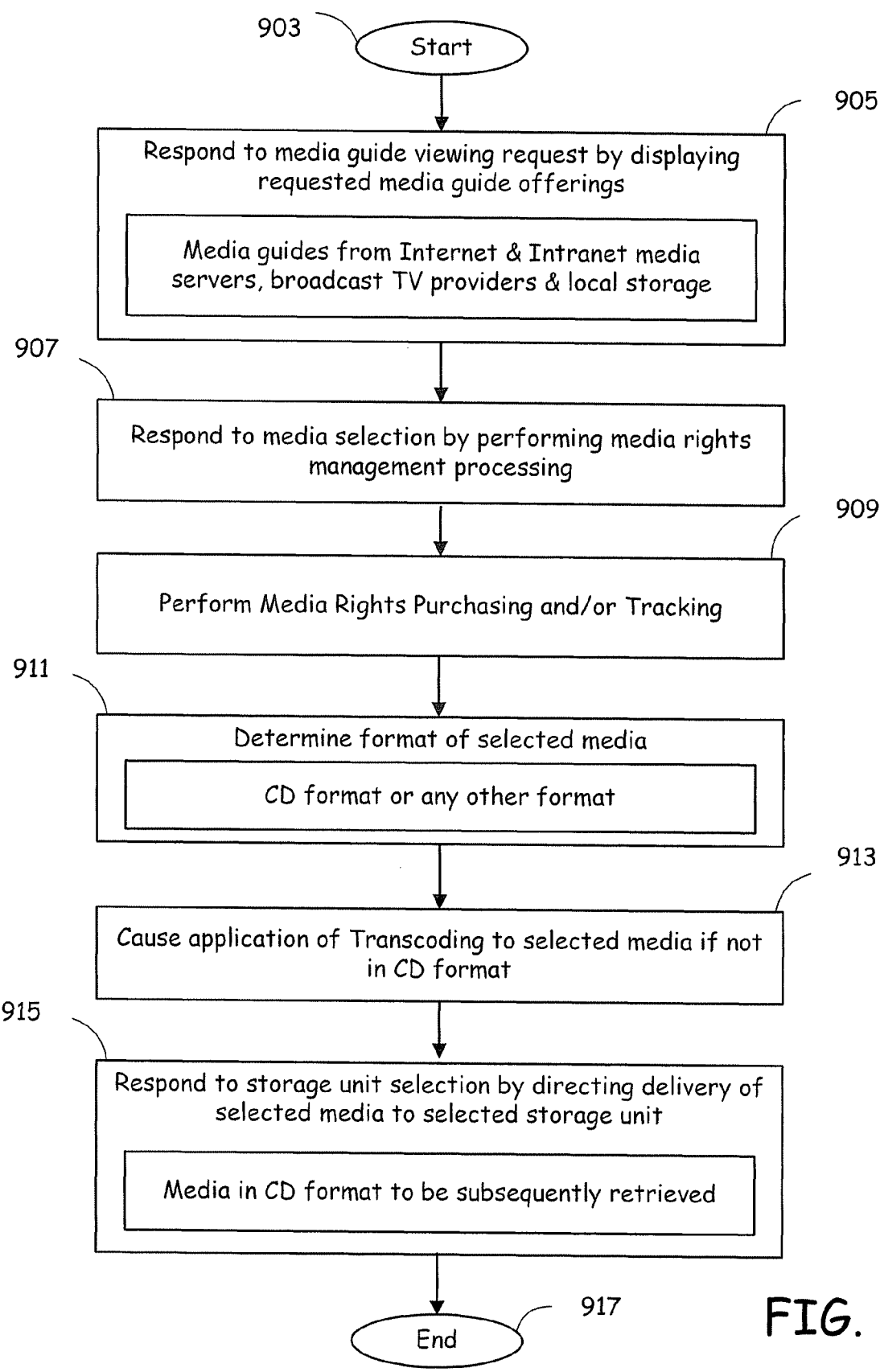
FIG. 9 is a flowchart illustrating a method of controlling selection and delivery of processed media to a storage system for replay at a subsequent instant on a screen of the control device by the control device of FIG. 8.

FIG. 9 is a flowchart illustrating a method of controlling selection and delivery of processed media to a storage system for replay at a subsequent instant on a screen of the control device by the control device of FIG. 8. The method may begin at a start block (or step) 903. In a next block 905, the control device responds to a media guide viewing request from a user. The user may enter the media guide viewing request through an input interface of the control device. In such case, the control device may receive the media guide viewing request via the input interface of the control device at block 905 and respond to the request by receiving the media guide from the media source and displaying the media guide on the screen of the control device. A media source may, for example, comprise one of an Internet media server, an Intranet media server, a broadcast television provider and a local media storage such as a hard drive, a DVD, a CD and a tape. The media guide identifies a plurality of media elements available with the media source. The media guide helps the user to make a media selection of one or more than one media element from the plurality of media elements for storage in a storage unit. A media element may, for example, comprise a movie, a television channel, an audio-visual game, a photo, a live snippet, a video, video portion of a television channel or a video game. The storage unit may, for example, comprise one of an Internet media server, an Intranet media server and a local media storage such as a hard drive, a DVD, a CD and a tape.

At a next block 907, the control device receives the media selection from the user. The media selection may be based on the media guide. The media selection identifies, for example, a media element. The control device sends a request to the media source seeking delivery of the selected media element from the media source. The selected media element may be a free-to-use media element. If the selected media element is not free, then the control device purchases the selected media element at a next block 909. Purchasing may, for example, include one of, or a combination of, key-based and plastic-card-based purchasing. Purchasing may include one or more user interactive steps, where the user is guided through displays on the screen of the control device followed by the control device receiving entries from the user via the input interface of the control device. If the selected media element is free-to-use, then the control device might not purchase the selected media element. Even then, the control device may perform credential verification functionalities at block 909.

The control device determines the format of the selected media element at a next block 911. The selected element may be, for example, in a format supported by the screen of the control device or in a different format that is not supported by the screen of the control device. The selected media element, after storing in the storage unit, may be retrieved at a subsequent time and played on the screen of the control device. If the control device determines that the selected media element is riot in the format supported by the screen of the control device, then the control device directs application of transcoding to the selected media element to generate a transcoded media, as shown at block 913. The control device directs the selected media element through a transcoding unit to generate the transcoded media. The control device may comprise the transcoding unit. The control device causes the transcoded media to be forwarded to the storage unit at a next block 915.

The control device might not be able to perform the transcoding because of limited processing capability, limited power and/or limited memory. In that case, the control device may direct the selected media element through a transcoding server to generate the transcoded media at block 913. The transcoded media (or video portion of the transcoded media) thus stored in the storage unit at block 915 is fit for display on the screen of the control device.

In summary, various aspects of the present invention provide a remote control device that interacts with a television, a media storage system and/or a media source. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

We claim:

1. A remote control device for controlling a home entertainment system that receives a plurality of television channels and a channel guide, the home entertainment system comprising: a set top box at a first premises to receive the plurality of television channels and the channel guide, the set top box communicatively coupled to a communication network; and a television at the first premises and communicatively coupled to the set top box to receive a first one of the plurality of television channels, the television comprising a first screen to display the first one of the plurality of television channels; and the remote control device being at a second premises remote from the first premises;
the remote control device comprising circuitry adapted to request the channel guide and a second one of the plurality of television channels from the set top box via the communication network, the remote control device comprising a second screen to selectively display the channel guide and the second one of the plurality of television channels on the second screen;
a removable storage unit coupled to the set top box, wherein:
the remote control device is adapted to direct the set top box to store a television program of the second one of the plurality of television channels to the removable storage unit;
the removable storage unit is adapted to be removed from the set top box and coupled to the remote control device;
the remote control device is adapted to retrieve the television program from the removable storage unit coupled thereto, and display the retrieved television program on the second screen; and
the set top box is adapted to transcode the television program and store the television program to the removable storage unit in both a first format suitable for display on the first screen of the television and a second format suitable for display on the second screen of the remote control device to permit playback to both the first screen and the second screen.

2. The remote control of claim 1, wherein: the circuitry is adapted to direct the set top box to deliver a third one of the plurality of television channels to a storage system; and
the remote control device further comprises a user input interface that is adapted to receive:
a storage system selection that identifies the storage system; and
a channel selection that identifies the third one of the plurality of television channels.

3. The remote control device of claim 2, wherein the circuitry is further adapted to direct delivery of the third one of the plurality of television channels from the storage system to the first screen of the television for display.

4. The remote control device of claim 3, wherein the user input interface of the remote control device is further adapted to:
receive a user input identifying replay; and
direct the delivery of the third one of the plurality of television channels from the storage system to the first screen of the television based on the user input.

5. The remote control device of claim 4, wherein the circuitry further directs delivery of the stored third one of the plurality of television channels from the storage system to the second screen of the remote control device for display.

6. The home entertainment system of claim 1, wherein the set top box is adapted to transcode the television program and store the television program to a storage system in both a first format suitable for display on the first screen of the television and a second format suitable for display on the second screen of the remote control device to permit playback to the first screen and the second screen.

7. The home entertainment system of claim 1, wherein:
the remote control device is further adapted to request the set top box to retrieve the television program that is currently being displayed by the television; the set top box is further adapted to forward the television program that is currently being displayed by the television to the remote control device in response to the request; and
the remote control device is further adapted to display, upon the second screen, the television program that is currently being displayed by the television.

8. A control device that interacts with a media source via a set top box for a television, the control device comprising:
a video display;
a communication interface;
a user input interface adapted to receive a storage selection and a media selection, the media selection identifying a media element that comprises a video portion and an audio portion;
a removable storage unit interface; and
at least one module adapted to:
retrieve via the communication interface and the set top box the media element from the media source;
direct display of the video portion of the media element on the video display; and
send a control signal via the communication interface that directs the set top box to deliver the media element to a removable storage unit of the set top box per the storage selection to permit future playback of the media element, wherein the set top box is adapted to reformat the media element and store the media element to the removable storage unit in both a first format suitable for display on a screen of the television and a second format suitable for display on the video display of the control device to permit playback to both the screen of the television and the video display of the control device.

9. The control device of claim 8, further comprising a speaker, wherein the at least one module is further adapted to play the audio portion of the media element through the speaker.

10. The control device of claim 8, wherein:
the at least one module is adapted to receive media guide information via the communication interface, the media guide information identifying a plurality of media elements available with the media source; and
the media selection is based on the media guide information.

11. The control device of claim 8, wherein:
the at least one module is adapted to receive repository guide information via the communication interface, the repository guide information identifying a plurality of storage systems; and
the storage selection is based on the repository guide information.

12. The control device of claim 8, wherein the control device further comprises a storage system to store received media elements.

13. The control device of claim 8, wherein the at least one module is further adapted to send a second control signal directing delivery of the media element from the removable storage unit to the control device.

14. The control device of claim 13, wherein the video portion of the media element is adapted for the screen of the control device.

15. The control device of claim 14, wherein the video portion of the media element is adapted for the screen of the control device via transcoding.

16. The control device of claim 8, wherein the at least one module is further adapted to request the set top box to identify and provide a media element that is currently being displayed by the television, and to direct display of the media element that is currently being displayed by the television to the video display of the control device.

17. A portable control device for interacting with a television and a set top box located at a first premises, the television comprising a first screen, and a video source located at a second premises, the control device comprising:
 a communication interface;
 a second screen;
 at least one module adapted to receive video guide information through the communication interface and the set top box, and to direct display of the received video guide information on the second screen; and
 a user input interface adapted to receive selection of first video information and second video information based on the displayed video guide information; wherein the at least one module is further adapted to:
 send a first control signal requesting the set top box to deliver the first video information from the video source to the first screen of the television for display;
 receive the second video information through the set top box and the communication interface, wherein second video information is reformatted and stored to a removable storage unit in both a first format suitable for display on the first screen of the television and a second format suitable for display on the second screen of the remote control device to permit playback to both the first screen and the second screen.

18. The control device of claim 17, wherein the at least one module is further adapted to request the set top box to identify and provide video information that is currently being displayed by the television, and to direct display of the video information that is currently being displayed by the television to the video display of the control device.

19. The control device of claim 17, wherein the storage system is located at a third premises.

20. The control device of claim 17, wherein the at least one module is adapted to direct display of the second video information on the second screen.

21. The control device of claim 20, wherein the communication interface is adapted to receive the video guide information and the second video information via set top box circuitry.

22. The control device of claim 17, wherein:
 the user input interface is further adapted to receive a user input identifying replay of the second video information on the first screen of the television; and
 the at least one module is further adapted to direct replay of the second video information based on the user input.

23. The control device of claim 17, wherein the at least one module is further adapted to convert the second video information to a format suitable to be displayed upon the second screen, and
 deliver the second video information to the storage system after converting the second video information.

24. A remote control device for controlling a home entertainment system that receives a plurality of television channels and a channel guide, the home entertainment system comprising: a set top box to receive the plurality of television channels and the channel guide, the set top box communicatively coupled to a communication network; and a television communicatively coupled to the set top box to receive a first one of the plurality of television channels, the television comprising a first screen to display the first one of the plurality of television channels;
 the remote control device comprising circuitry adapted to request the channel guide and a second one of the plurality of television channels from the set top box, the remote control device comprising a second screen to selectively display the channel guide and the second one of the plurality of television channels on the second screen;
 a removable storage unit coupled to the set top box, wherein:
 the remote control device is adapted to direct the set top box to store a television program of the second one of the plurality of television channels to the removable storage unit;
 the removable storage unit is adapted to be removed from the set top box and coupled to the remote control device; and
 the remote control device is adapted to retrieve the television program from the removable storage unit coupled thereto, and display the retrieved television program on the second screen; and
 wherein the set top box is adapted to reformat the television program and store the television program to the removable storage unit in both a first format suitable for display on the first screen of the television and a second format suitable for display on the second screen of the remote control device to permit playback to both the first screen and the second screen.

* * * * *